(No Model.)
E. P. COWLES.
UNIVERSAL JOINT.
No. 317,737. Patented May 12, 1885.
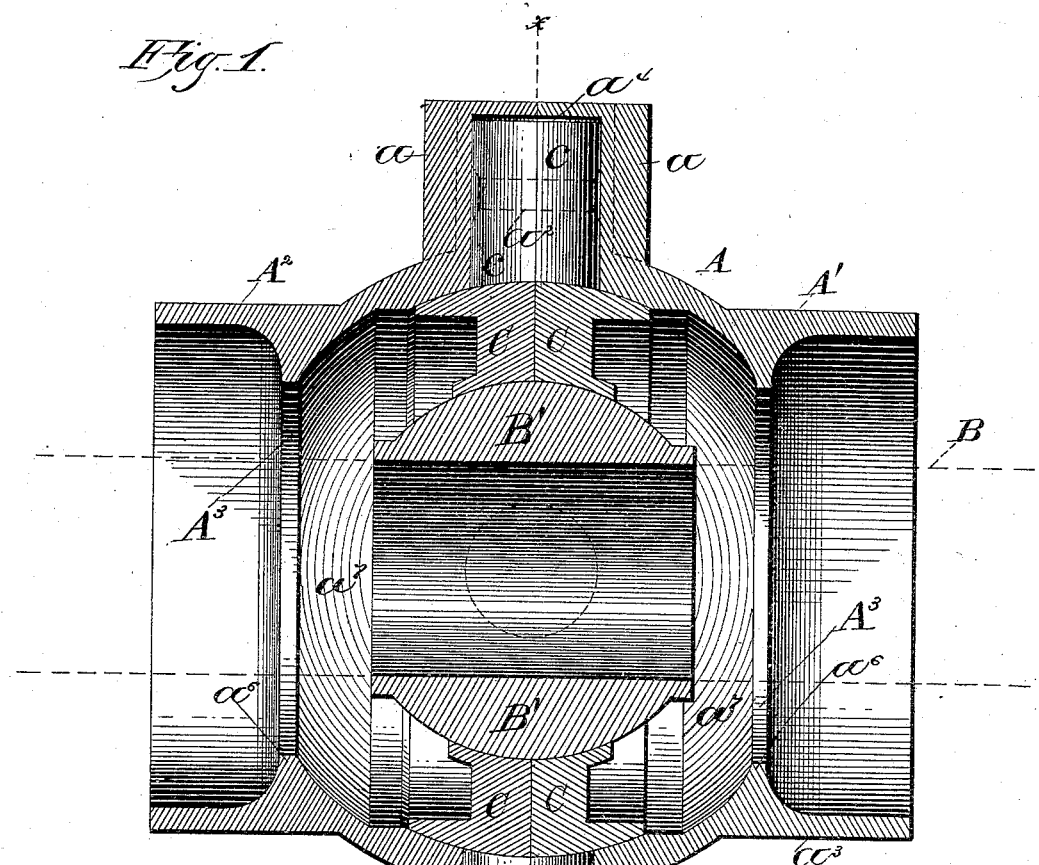
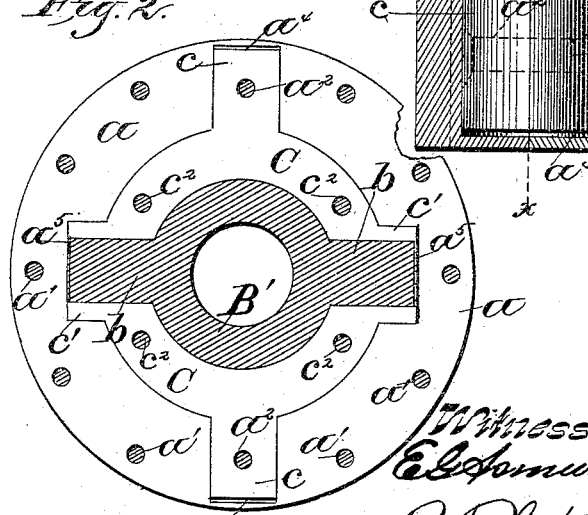
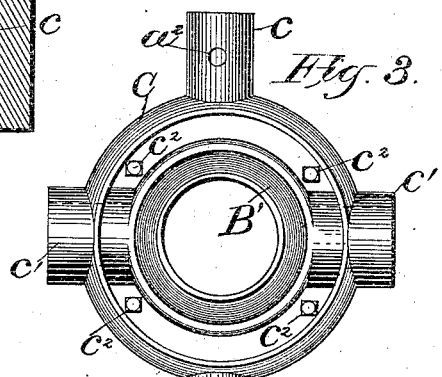
Witnesses:
E. G. Homus
R. Platz
Inventor:
E. P. Cowles
By Stout & Underwood
Attorneys.

UNITED STATES PATENT OFFICE.

EDWARD P. COWLES, OF WEQUIOCK, WISCONSIN.

UNIVERSAL JOINT.

SPECIFICATION forming part of Letters Patent No. 317,737, dated May 12, 1885.

Application filed December 16, 1884. (No model.)

*To all whom it may concern:*

Be it known that I, EDWARD P. COWLES, of Wequiock, in the county of Brown and in the State of Wisconsin, have invented certain new and useful Improvements in Wheel Hubs and Axles; and I do hereby declare that the following is a full, clear, and exact description thereof.

My invention relates to improvements in universal joints; and it consists in peculiarities of construction, as will be fully described hereinafter.

In the drawings, Figure 1 is a central sectional view of a wheel-hub attached onto a shaft by means of a universal joint embodying my invention. Fig. 2 is a cross-section through the wheel-hub and jointed shaft on line $x\ x$ of Fig. 1, and Fig. 3 is a side elevation of my improved universal joint.

The object of my invention is to provide a flexible joint by means of which a wheel-hub may be connected to a rotating shaft, so that its plane of rotation may be changed at any angle to the axis of the shaft while the said hub is rotating with the shaft. In this universal joint the bearing parts are constructed so as to be adapted to resist great pressure, acting in the direction of the plane of rotation and when the rotary power to be communicated is considerable.

A further object of my invention is to provide in the hub an oil-chamber, by means of which all the bearing-faces of the universal joint can be kept properly lubricated.

A is the wheel-hub and B is the shaft. The hub consists of a spheroidal shell made in two parts, $A'\ A^2$, each being provided with a flange, $a$, perforated as at $a'$, for the bolts that fasten them together after the joint has been set in position.

Projecting out of the shell on each side and at right angles to the flanges $a$ is an annular flange, $a^3$, by means of which and of suitable fastenings the hub may be connected to a wheel or pulley. To these flanges also may be attached any suitable device to regulate the plane of rotation of the hub as desired. An opening is left on each side, as at $A^3$, to allow for the passage and the vibration of the shaft B. The flanged rims $a$ are recessed at diametrically opposite points, as at $a^4\ a^4$, to receive the trunnions $c\ c$, that project out at corresponding points of the ring C C, bearing freely therein. The said rims $a$ are also recessed at diametrically opposite points, at right angles to the recesses $a^4$, and these recessed chambers or slots $a^5$ are designed to receive the annular extensions $c'\ c'$ formed at corresponding points on the outer edge of the ring C C. These extensions $c'\ c'$, the central perforations of which are extended through the body of the ring, are designed to receive the trunnions $b\ b$, that project from diametrically opposite points of the ball B'.

The ring C is made in two parts, and these are firmly held together by means of the bolts or rivets $c^2\ c^2$ after the ball has been set in position between the said parts, as well as by the bolts $a^2$ passing through the trunnions $c$. The outer edge of the ring C is convexed to bear evenly against the inner face of the hub-shell, while the inner edge of the said ring is concaved to fit loosely and bear over the periphery of the ball B', thus affording solid bearings for the jointed parts and enabling them to resist great pressure in the plane of rotation and to transmit a great power.

The ball B' is centrally perforated to receive the rotating shaft B, and is fastened in position on the said shaft by means of the usual key. (Not shown.)

The spheroidal shell of the hub A is extended inward as at $a^6$, on each side, beyond the range of the bearing parts, so as to form a chamber or reservoir, $a^7$, for oiling purposes. This arrangement is designed in view of the great trouble experienced in properly lubricating universal joints generally. As the hub is rotated its surfaces take up the oil, which is then made to constantly drip down on all of the bearing faces of the joint and of the recesses into which the trunnions $b\ b$ and $c\ c$ work, thus keeping all the parts thoroughly lubricated, as required.

The advantages resulting from the construction of my flexible joint will be readily understood from the above description and the accompanying drawings. The interposition between the ball of the shaft and the hub-shell of the ring C, having a convexed outer rim and a concaved inner rim, against which work the corresponding faces of both the hub and ball, secures solid bearings between the parts jointed, and is calculated to give to the joint the strength necessary to resist great pressures in the direction of the plane of rotation when a great power has to be transmitted.

It will be observed that the trunnions of both the ring C and the ball B' are made solid with the said parts, and that those of the ball itself are extended beyond the ring C and into the recessed shell, so as to give a longer leverage to the same. By reason of the peculiar construction of my device this is effected without extending the dimensions of the universal joint beyond a practical limit of size and weight of the parts.

Having thus described my invention, what I claim as new, and desire to secure by Letters Patent, is—

1. A hollow hub connected with a rotating shaft by means of a universal joint, adapting both to transmit the power in a plane of rotation passing at any angle through the axis of the shaft while both the shaft and the hub are rotating together, substantially as set forth.

2. In a hollow hub connected with a rotating shaft by a universal joint, an oil-chamber formed by the raised extensions $a^6$ of the hub, as set forth.

In testimony that I claim the foregoing I have hereunto set my hand, at Milwaukee, in the county of Milwaukee and State of Wisconsin, in the presence of two witnesses.

EDWARD P. COWLES.

Witnesses:
S. S. STOUT,
H. G. UNDERWOOD.